United States Patent [19]
Sato

[11] 3,929,515
[45] Dec. 30, 1975

[54] METHOD FOR CUTTING OVERLAPPING METAL PLATES WITH GAS HEAT

[76] Inventor: Kozo Sato, No. 7-12, Minami 3-chome, Yamamoto-cho, Yao, Osaka, Japan

[22] Filed: Sept. 27, 1974

[21] Appl. No.: 510,009

[52] U.S. Cl. .................................... 148/9 R; 148/9
[51] Int. Cl.² ........................................ B23K 7/08
[58] Field of Search .......................................... 148/9

[56] References Cited
UNITED STATES PATENTS

| | | | |
|---|---|---|---|
| 2,538,876 | 1/1951 | Meincke | 148/9 |
| 3,338,757 | 8/1967 | Dodge et al. | 148/9 |
| 3,468,726 | 9/1969 | Sato | 148/9 |

*Primary Examiner*—W. Stallard
*Attorney, Agent, or Firm*—George B. Oujevolk

[57] ABSTRACT

A method for cutting overlapping metal plates with gas heat without application of mechanical pressure thereto. This method is characterized by the insertion of active, viscostic and plastic filler material between the overlapping metal plates thereby filling in gaps developed on the contacting surfaces thereof, with the result that the plural number of metal plates join together in the overlapping state in close adhesion with each other thereby applying the gas heat from the uppermost plate effectively to the bottom plate.

3 Claims, No Drawings

METHOD FOR CUTTING OVERLAPPING METAL PLATES WITH GAS HEAT

BACKGROUND OF THE INVENTION

The present invention relates to a method for cutting overlapping metal plates with gas heat and more particularly to the use of a specific filler which is put in between the overlapping metal plates prior to the application of gas heat thereto so that the filler will correct warps and the like on the contacting surfaces, thereby applying the gas heat fully all through the overlapping metal plates.

BRIEF DESCRIPTION OF THE PRIOR ART

Heretofore cutting of overlapping metal plates with the use of gas-burner has been practised. In the conventional method, however, the heat-cutting is hindered by gaps between the overlapping plates as a result of warps and the like developed on the contacting surfaces. The gaps cause the gas heat to disperse within said gaps thereby making it difficult for the gas heat to reach all through the plates from the top to the bottom.

The maximum permissible value of said gap for the gas heat-cutting is prescribed as 0.08mm. As a matter of fact, most metal plates now in general use develop warps on their surfaces so big as to form a gap in their overlapping state surpassing this maximum permissible value mentioned above.

As a coutermeasures for solving the problem, application of pressure on the overlapping plates has been used, the pressure when suitably applied —1.75 kg/cm² for example — stretching the warp and lessening the gap below the maximum permissible value.

Also, in the process, from time to time, the overlapping metal plates are stuck to each other at the corners by means of welding preventing the warps from turning back to the original state.

These countermeasures, however, cause too many problems to be practised mainly from economical and technological view points, i.e., expense of time and money for the installation of costly machiner for the pressure application, for the continuous use of the afore-mentioned process, removal of slags from the metal plates after the heat-cutting, and the like. Also, the gap removing method dependent on pressure application is likely to cause the development of bigger warps on the metal plates after the heat-cutting.

The present invention, on the other hand, provides a method for heat-cutting the overlapping metal plates by means of inserting active, viscostic and plastic filler material in between the overlapping metal plates so as to fill in gaps so as to carry out the heat-cutting of overlapping metal plates effectively and easily without application of the foregoing mechanical pressure.

OBJECTS OF THE INVENTION

A main object of this invention is to obviate the foregoing defects of the conventional method for heat-cutting overlapping metal plates by providing a method for cutting the overlapping metal plates with gas heat using a specific filler for fulfilling gaps between overlapping plates so as to carry out the heat-cutting effectively without depending on the application of mechanical pressure on the overlapping metal plates as in the case of the conventional heat-cutting method.

The other object of this invention is to provide a method for cutting overlapping metal plates and to economize time and money required for the cutting operation as compared to conventional methods in the same field.

The afore-mentioned filler is the most important factor constituting this invention, needless to say, or rather it might as well be said that the filler is nearly the entire gist of this invention.

The filler, to be compounded, has activity, viscosity and plasticity as its prerequisite property, said property being taken into account in the cutting practice so as to accord with the size the gaps taking place between the overlapping metal plates to be cut.

How to prepare the filler:

Prepared at first is a composite consisting of alignate soda 75 percent, denaturant of vinyl acetate 20 percent, surface-tension reducing surface-active agent 1 percent, nonion chelating agent 3 percent, dispersity stabilizing surface-active agent 1 percent.

This composite is mixed at a ratio of 11 percent to a 2 percent solution of amine naphthenate soap.

The above mixed solution is shaken moderately in the temperature range of between 40° and 50°C continuously for 20 hours under a depressed pressure within so as not to allow the intrusion of bubbles therein, resulting in the production of the required filler in the state of a strongly adhesive paste. The activity, viscosity and plasticity of said filler fit the needs that this inventor sought throughout testings in this invention — 100 percent efficiency for filling gapgs between the overlapping metal plates. The inventor obtained the filler below 30 Dyne/cm in surface tension as he originally set as the target, said property enabling said filler to infiltrate well into organs of the contacting surfaces of overlapping metal plates thereby enabling to bring said contacting surfaces to a closer adhesion.

In addition to the foregoing property, the filler in this invention enables to prevent corrosion of metal plates due to the nonion chelating agent mixed therein as referred to hereinbefore, said corrosion-proof character being important especially in the case of a coating chemical materials on two contacting metal surfaces wherein corrosion is more developable than in the case of one metal plate.

The filler in this invention has been tested in three embodiments as following:

1st embodiment:

The gap between overlapping metal plates is below 1 mm: Said filler as it is pasty immediately after its manufacture is coated thinly and evenly with the use of a spatula and the like on the surface of a metal plate over which the other metal plate is going to lap, this process enables the two plates to overlap in close adhesion forming no gap at all therebetween.

2nd embodiment:

The gap between the overlapping plates ranges from 1 mm to 2 mm:

The originally-pasty filler is dried and crushed into granular fragments each measuring below 0.5 mm.

An aqueous solution of amine naphthenate soap is lightly brushed on surface so as not to leave unbrushed spots, said brushing being conducted with the use of a sponge and the, thence the afore-mentioned granular filler is coated lightly and evenly over the brushed surface. In this state, the dried, granular filler regains viscosity and plasticity in the process of absorbing the soap solution thereby forming a viscostic and plastic plate in between the overlapping metal plates thereby eliminating gaps root and branch therebetween.

3rd embodiment:
In case of the gap ranging from 2 mm to 3 mm:

The filler in a pasty state is coated at first on an iron plate and the like so as to form a plate member 0.5 mm — 1 mm in thickness in its dried state. The plate-like filler regains the active, viscostic, plastic character after dipping in 2 percent aqueous solution of amine naphthenate soap for one minute.

The film-like filler is put in between the overlapping plates thereby penetrating into every corner of the contacting surfaces, thereby completely filling up gaps formed therebetween.

To meet a more complex state of warp development on the metal plates such as the coincidental formation of warps between the confronting upper and lower surfaces so as to be inconsistent with each other, a plural number of said film-like fillers are preferable together.

The filler material of the foregoing embodiments makes possible the heat-cutting of overlapping metal plates by means of gas heat and the heat acts evenly on the cutting portion, the filler on the rest of the surfaces as result of its carbonization acts as of defense wall against the spread of gas fire.

The filler material is harmless and will not cause any trouble later on in welding work and the like on the metal plates.

What is claimed is:

1. A method of heat-cutting stacks of overlapping metal plates with gas heat so that notwithstanding gaps in the plates or warping of the plates, the gas heat applied to an outer plate will rapidly penetrate the entire stack comprising applying to the contacting surfaces of the plates a filler material consisting of:
    a. 75 percent alginate soda;
    b. 20 percent of a vinyl acetate denaturant;
    c. 1 percent of a surface-tension reducing surface-active agent;
    d. 3 percent of a non-ion chelating agent;
    e. 1 percent of a dispersity stabilizing surface-active agent;
    f. 11 percent of the forgoing components being mixed with a 2 percent solution of amine naphthenate soap; and, heat-cutting the stacked metal plates.

2. A method as claimed in claim 1 wherein said filler material is a paste applied to the surface of the plates.

3. A method as claimed in claim 1 wherein said filler material is dried, and crushed into granular fragments each below about 0.5mm, the surface of the plates being first coated lightly with amine naphthenate soap, the fragments being coated thereon.

* * * * *